Oct. 24, 1950      C. R. BACCA      2,526,720
MASTER CYLINDER FOR HYDRAULIC BRAKES
Filed Jan. 15, 1945
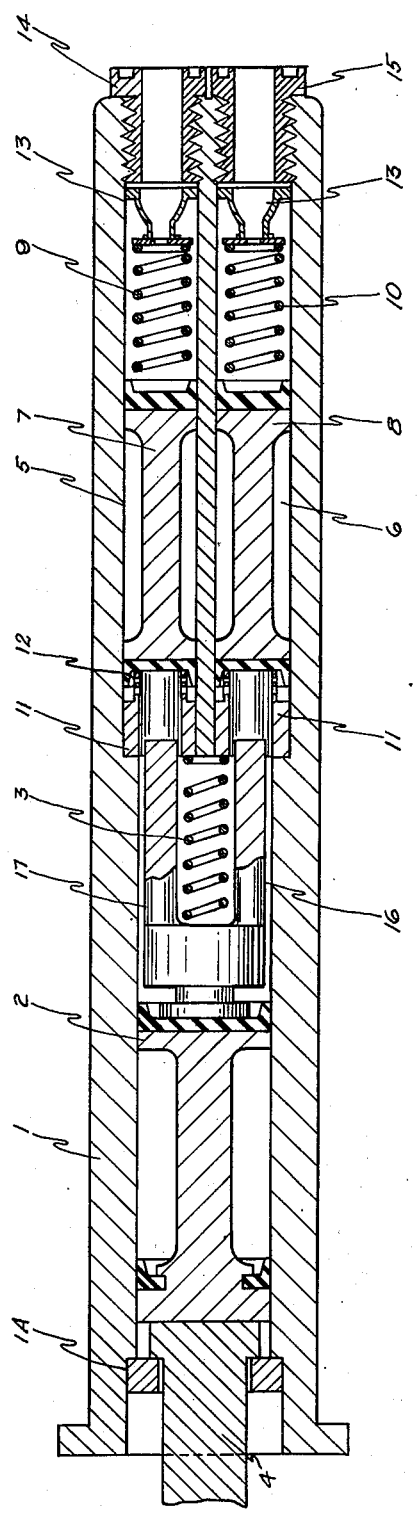
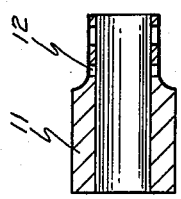
INVENTOR.
CHARLES R. BACCA
BY *Allen & Allen*
*Attorneys*

Patented Oct. 24, 1950

2,526,720

UNITED STATES PATENT OFFICE 2,526,720

MASTER CYLINDER FOR HYDRAULIC BRAKES

Charles R. Bacca, Mount Washington, Ohio

Application January 15, 1945, Serial No. 572,778

10 Claims. (Cl. 60—54.5)

My invention relates to an hydraulic brake primarily for use in automobiles or other vehicles having a plurality of wheels or the like to be braked at the same time. While in the drawing and in the following description I will describe my invention in connection with an automobile, it is to be understood that it may be used wherever a braking system of any kind is desired wherein more than one moving or revolving piece of mechanism must be braked or wherein the hydraulic pressure at numerous remotely located positions must be maintained or partially maintained.

The hydraulic systems in use at the present time on automobiles and the like usually comprise a master cylinder carrying a master piston which is actuated by means of a brake pedal. Running from the master cylinder to the different hydraulically operated brakes on the wheels of the vehicle, is a number of hydraulic lines. In the usual construction there are two of these lines, one running to the two rear brakes and the other running to the two front brakes. Inasmuch as an hydraulic brake similar to the above description must always be sealed with fluid (usually oil) in order to be operative, if the line to one of the brakes should rupture, the hydraulic pressure throughout the whole system is immediately lowered, and the actuation of the master piston will fail to impart sufficient hydraulic pressure to any of the wheel brakes to actuate them. This is also true in the event that a leak should occur in the master cylinder itself or in the event that insufficient fluid should be inserted in the master cylinder.

It is an object of my invention to provide an hydraulic brake similar to that described above, but wherein the rupture of a single line leading to the master cylinder will not reduce the hydraulic pressure in the other lines and thus make them inoperative.

It is a further object of my invention to provide an hydraulic brake wherein the loss of fluid from the master cylinder will not reduce the pressure in the outlying lines and thus make the outlying hydraulic brakes inoperative.

It is a further object of my invention to provide an hydraulic brake having all of the above advantages which may be easily and readily constructed and quickly placed upon current automobiles having hydraulic systems by merely removing the master cylinder and inserting my device in its place.

Another object of my invention is to provide an hydraulic brake having all of the above advantages and which is simple to repair and maintain and relatively inexpensive to construct.

These and other objects of my invention, which will be set forth hereinafter or will be apparent to one skilled in the art upon reading these specifications, I accomplish by that certain construction and arrangement of parts of which I shall now describe an exemplary embodiment.

Reference is made to the drawing which forms a part hereof and in which:

Figure 1 is a horizontal cross-section of the hydraulic master cylinder showing my invention.

Figure 2 is a cross-section of a sleeve which is incorporated in my novel hydraulic master cylinder.

Briefly, in the practice of my invention and referring to the drawing, I provide a master cylinder 1 within which is the master piston 2. The master piston 2 is maintained in the base of the cylinder 1 by the spring 3. A rod 4 pushes the piston and is operated by a pedal or the like to force the piston 2 away from the cylinder head and to the right in Figure 1 for operation of the brakes.

At the open end of the cylinder 1 and in longitudinal alignment therewith, I provide two supplemental cylinders 5 and 6. Within these supplemental cylinders, I provide supplemental pistons, 7 and 8. The pistons 7 and 8 have no piston rod and are freely reciprocable in their respective cylinders, and are normally urged to the left in Figure 1 by springs 9 and 10. I provide sleeves 11 (Figure 2) which limit the leftward movement of the pistons 7 and 8 and which have apertures 12 to permit the flow of fluid from the master cylinder 1 into the front portion of the supplemental cylinders 5 and 6 against the front part of the pistons 7 and 8 or the cup seals therefor. There are also sleeves 13 upon which the base of the springs 9 and 10 abuts. These are double acting valves and are perforated to permit the flow of fluid. The different pistons have the usual rubber seals, and in the drawings I have shown double pistons, although simple pistons may be desirable.

At the open ends of cylinders 5 and 6, I provide nuts to which are attached the hydraulic lines leading to the brakes. As an example, the line to the rear brakes may be attached to nut 14, and the line to the front brakes to the nut 15. I have not shown the lines running from the nuts 14 and 15, nor have I shown the actual hydraulic brakes on the wheel drums, since these are not a part of my invention and are the usual type. The whole system is understood to be filled with fluid, such as oil or glycerine, and bleeding plugs may be provided for clearing the system, and fluid reservoirs may be used, if desirable, feeding into the master cylinder and the supplemental cylinders to maintain fluid completely within the system. Or it may be desirable to provide one large reservoir with portions partitioned off from each other and each feeding into one of the cylinders.

Longitudinally projecting from the master piston 2, I provide rods 16 and 17. These rods are permanently fastened to the face of the piston 2 and are in longitudinal alignment with each of the supplemental cylinders 5 and 6, and hence, in alignment with the supplemental pistons 7 and 8. This alignment is maintained by making the rods 16 and 17 sufficiently long so that they will slightly project within the sleeves 11 and thus prevent the piston 2 from revolving and moving the rods 16 and 17 out of alignment. The cross-sectional area of the master cylinder is equal to the sum of the cross-sectional areas of all the supplemental cylinders, so that under normal operation the movement of the master piston will be reflected in a like and equal movement of all the supplemental pistons. The rods 16 and 17 do not normally contact the pistons 6 or 7 either when the master piston 2 is seated at the piston head or when the hydraulic brakes are operating properly, but they are of such length that if the hydraulic pressure is lowered in the master cylinder or in the lines so that the movement of the master piston 2 will not by means of hydraulic pressure move the supplemental pistons 7 and 8, then the ends of the rods 16 and 17 will contact the pistons 7 and 8 and move them to the right in Figure 1.

The operation of my novel hydraulic device is as follows. When the brakes of the automobile are in the "off" position, the position of the elements is as in Figure 1. Assuming that the hydraulic braking system is completely filled with fluid and operating properly, then the actuation of the brake pedal will move the master piston 2 to the right through the piston rod 4. The movement of the master piston 2 to the right will create a pressure in the portion of the master cylinder 1 beyond the piston head which, in turn, will flow through the sleeve holes 12 and will move supplemental pistons 7 and 8 to the right the same distance as the movement of the master piston 2. The fluid beyond the supplemental pistons 7 and 8 will then create hydraulic pressure to the individual hydraulic brakes on the wheels of the automobile through the hydraulic lines.

In the event that there is a leak in one of the hydraulic lines, for example, the line connected to nut 15, then when the master piston is moved to the right, the pressure on the liquid beyond the head of the piston 2 will be dissipated through the lowered pressure in that line and supplemental piston 8 will move readily, and the pressure will be so lowered that the supplemental piston 7 would not move at all. In this case, as the master piston moves to the right, the end of rod 17 will contact the piston 7 and force it to the right, thus applying the brakes attached to nut 14, which are the rear brakes. From this, it will be apparent that if the line to the front brakes should break, the rear brakes will still be operative by reason of the rod projecting from the head of the master piston 2. Of course, if the rear line should break and the line to the front brakes remain intact, the front brakes would operate. It is also apparent that if there should be a leak in the cylinder 1 between the master piston 2 and the supplemental pistons 7 and 8, then both rods 16 and 17 would contact both supplemental pistons 7 and 8 and all of the brakes of the automobile would be actuated.

While in the above description I have described a brake having only two supplemental pistons, it is within the scope of my invention to provide as many supplemental pistons and as many hydraulic lines as may be desirable.

It is apparent that my novel hydraulic device has all of the benefits of an hydraulic brake with the additional safety factor that if a line should fracture or if the fluid should leak out of the master cylinder, some brakes would be applied. It is also apparent that my invention is all contained within the fixture carrying the master cylinder and hence may be installed in any automobiles having a master cylinder by merely removing the same and replacing it with my device and attaching the usual hydraulic lines to the outlet nuts 14 and 15 on my device.

It is to be understood that modifications may be made in my invention without departing from the spirit thereof, and I do not intend to limit myself other than by the claims which follow.

Having thus described my invention, what I claim as new and desire to secure by Letters Patent is:

1. An hydraulic brake comprising an hydraulic system including a master piston and cylinder and separate hydraulic lines leading from said master cylinder to different hydraulically actuated brakes, a portion of each hydraulic line comprising a cylinder with a piston freely reciprocable therein throughout its full stroke, the cross sectional area of the master piston being at least equal to the combined cross sectional areas of the second mentioned pistons, means between the master piston and the second mentioned piston for mechanically actuating said second mentioned pistons their full stroke only in the event they fail to be actuated by hydraulic pressure, and separate and independent spring means for returning under all conditions of operation each of the pistons to normal position.

2. An hydraulic brake comprising an hydraulic system including a master piston and cylinder and separate hydraulic lines leading from said master cylinder to different hydraulically actuated brakes, a portion of each hydraulic line comprising a cylinder with a piston freely reciprocable therein throughout its full stroke, the cross sectional area of the master piston being at least equal to the combined cross sectional areas of the second mentioned pistons, means between the master piston and the second mentioned pistons for mechanically actuating said second mentioned pistons their full stroke only in the event they fail to be actuated by hydraulic pressure, said means comprising projections adapted to contact said master piston and said second mentioned pistons, and separate and independent spring means for returning under all conditions of operation each of the pistons to normal position.

3. An hydraulic brake comprising an hydraulic system including a master piston and cylinder and separate hydraulic lines leading from said master cylinder to different hydraulically actuated brakes, a portion of each hydraulic line comprising a cylinder with a piston freely reciprocable therein throughout its full stroke, the cross sectional area of the master piston being at least equal to the combined cross sectional areas of the second mentioned pistons, rods projecting from a point adjacent said master piston and in longitudinal alignment with said second mentioned cylinders and of such a length that they will contact said second mentioned pistons and drive them their full stroke only upon failure of their actuation by hydraulic pressure, and spring means for returning under all conditions of operation each of the pistons to normal position.

4. An hydraulic brake comprising an hydraulic system including a master cylinder and at least two supplemental cylinders in longitudinal alignment with and opening into one end of said master cylinder, the cross-sectional area of the master cylinder being equal to the combined cross-sectional areas of the supplementary cylinders, a master piston actuable within said master cylinder, supplemental pistons freely reciprocable in said supplemental cylinders, rods projecting from a point adjacent the master piston into said supplemental cylinders with their ends spaced of said supplemental pistons, so that upon failure of movement of said supplemental pistons under hydraulic pressure energized by the advance of the master piston, the rod ends will contact the supplemental pistons and move the same their full stroke, said supplemental cylinders forming part of an hydraulic line to the brakes of an automobile, and spring means for returning under all conditions of operation each of the pistons to normal position.

5. In an hydraulic system having a master cylinder containing a master piston and a plurality of pressure lines connected with the master cylinder, a safety device comprising individual pistons freely reciprocable in each pressure line and projections from a point adjacent the master piston to actuate one or all individual pistons their full stroke only upon failure of hydraulic pressure in any of the lines or in the master cylinder, said master piston being at least equal in cross-sectional area to the combined cross-sectional areas of the second mentioned pistons, and spring means for returning under all conditions of operation each of the pistons to normal position.

6. In an hydraulic system a master cylinder and a plurality of supplemental cylinders in longitudinal alignment therewith, a pressure line connected to each supplemental cylinder, a freely reciprocable piston in each supplemental cylinder, a master piston in said master cylinder having projections on the head thereof to actuate the supplemental pistons their full stroke only upon failure of hydraulic pressure created by movement of the master piston to actuate them, said master piston being at least equal in cross-sectional area to the combined cross-sectional areas of the supplemental pistons, and spring means for returning under all conditions of operation each of the pistons to normal position.

7. An hydraulic brake comprising an hydraulic system including a master piston and cylinder and separate hydraulic lines leading from said master cylinder to different hydraulically actuated brakes, a portion of each hydraulic line comprising a cylinder with a piston freely reciprocable therein, means associated with said master piston for actuating said second mentioned pistons their full stroke only in the event they fail to actuate by hydraulic pressure, the cross-sectional area of the master cylinder being at least equal to the combined cross-sectional areas of the second mentioned cylinders, and spring means for returning under all conditions of operation each of the pistons to normal position.

8. An hydraulic brake comprising an hydraulic system including a master piston and cylinder and a plurality of supplemental cylinders in longitudinal alignment with and opening into one end of said master cylinder, the cross-sectional area of the master cylinder being at least equal to the sum of the cross-sectional areas of the supplemental cylinders, supplemental pistons freely reciprocable in said supplemental cylinders, means projecting from a point adjacent the surface of the master piston into said supplemental cylinders with their ends spaced from said supplemental pistons so that only upon failure of movement of said supplemental pistons under hydraulic pressure energized by the advance of the master piston, the ends of the means will contact the supplemental pistons and move the same their full stroke, said supplemental cylinders forming a part of hydraulic lines to the brakes of an automobile, and spring means for returning under all conditions of operation each of the pistons to normal position.

9. An hydraulic brake comprising an hydraulic system including a master piston and cylinder and a plurality of supplemental cylinders connected with the master cylinder, a freely reciprocable supplemental piston in each of the supplemental cylinders, the cross-sectional area of the master cylinder being at least equal to the combined cross-sectional areas of the supplemental cylinders, means interposed between the master piston and the supplemental pistons and normally spaced from either the master piston or said supplemental pistons to permit said supplemental pistons normally to be hydraulically actuated but adapted to contact any of the supplemental cylinders which are not hydraulically actuated by the master piston to be moved to its full stroke, and spring means for returning under all conditions of operation the pistons to normal position.

10. An hydraulic brake comprising an hydraulic system including a master piston and cylinder and a plurality of supplemental cylinders, each having a fluid connection with the master cylinder, a freely reciprocable supplemental piston in each of the supplemental cylinders, the cross-sectional area of the master cylinder being at least equal to the combined cross-sectional areas of the supplemental cylinders, a separate and independent spring means for holding the master piston and each of the supplemental pistons in retracted position, and mechanical means for moving each of the pistons to complete its full stroke upon failure of same being hydraulically actuated to its full stroke.

CHARLES R. BACCA.

REFERENCES CITED

The following references are of record in the file of this patent:

UNITED STATES PATENTS

| Number | Name | Date |
| --- | --- | --- |
| 1,897,230 | Bowen | Feb. 14, 1933 |
| 2,067,697 | Fontaine | Jan. 12, 1937 |
| 2,115,995 | McInnerney | May 3, 1938 |
| 2,124,363 | Bertrand | July 19, 1938 |
| 2,174,615 | Bowen | Oct. 3, 1939 |